United States Patent Office 3,252,724
Patented May 24, 1966

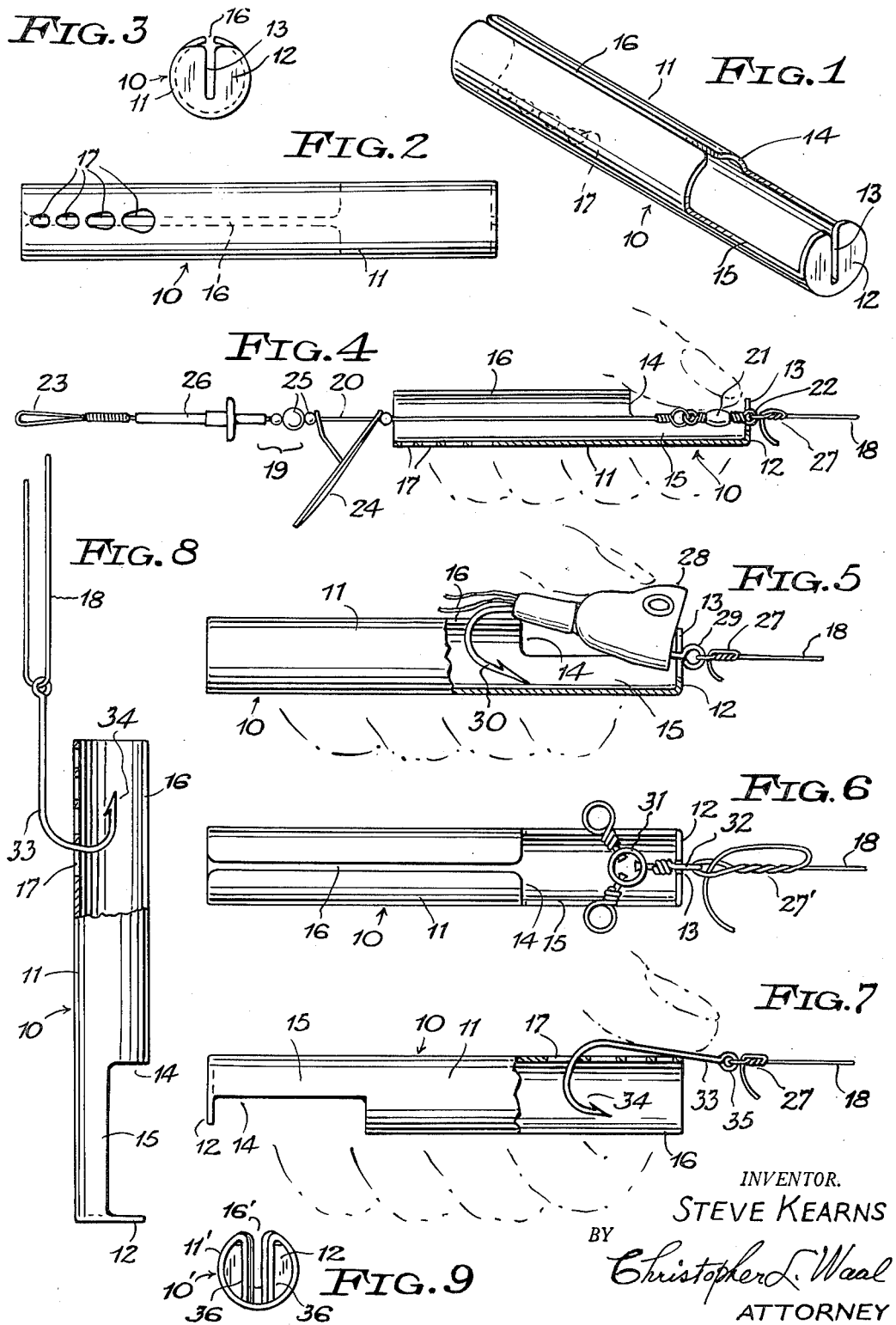

3,252,724
FISHLINE TYING IMPLEMENT
Steve Kearns, 1026-A S. 11th St., Milwaukee, Wis.
Filed Mar. 17, 1965, Ser. No. 440,490
7 Claims. (Cl. 289—17)

This invention relates to implements for facilitating the typing of fishlines and the like to fishing tackle articles.

An object of the invention is to provide an improved hand-held fishline tying implement by which an attaching eye of any one of various fishing tackle articles can be disposed or retained in suitable position to permit convenient tying of a fishline thereto.

Another object is to provide a fishline typing implement adapted to confine or enclose parts of a fishing tackle article during the tying operation.

Still another object is to provide a fishline tying implement which is arranged to form a fishhook guard during the tying operation.

A further object is to provide a fishline tying implement which is of simple and inexpensive construction and capable of inexpensive manufacture.

The invention further consists in the several features hereinafter described and claimed.

In the accompanying drawing,

FIG. 1 is a perspective view of fishline tying implement of the invention;

FIG. 2 is a side view of the implement showing the opposite side thereof;

FIG. 3 is an end view of the implement;

FIG. 4 is a longitudinal sectional view of the implement in use when tying a fishline to the eyed swivel of a bait-skewering lure of the "strip-on" type;

FIG. 5 is a side view of the implement in use when tying a fishline knot on a fishhook-carrying lure;

FIG. 6 is a side elevation of the implement in use when tying a fishline knot on an eye of a triple swivel, the knot being partially completed;

FIG. 7 is a side view, partly in section, showing the implement in use when tying a fishline knot on a fishhook eye;

FIG. 8 is a side view showing an initial stage of tying a knot on a fishhook, and FIG. 9 is an end view of a modified form of fishline tying implement.

In the drawing, the numeral 10 designates generally a fishline tying implement of the invention. The implement comprises a one-piece handle-forming body 11 of tubular shape having a relatively thin flat end wall 12 extending at about right angles to the longitudinal axis of the body. By way of example, the tubular body may be about three to four inches in length and about one-half inch in diameter. The end wall 12 is provided with a central radially extending slot 13 having a flared open end, the slotted end wall forming a flat laterally projecting bifurcated flange or ear. The tubular body is cut away adjacent to the end wall to form a notch or depression 14 and to leave a substantially semi-cylindrical abutment portion 15 from which the slotted end wall or flange 12 laterally projects, the end wall defining or bounding the outer end of the notch. The open space over the semi-cylindrical abutment portion 15 forms the notch 14 which is adapted to receive various eyed fishing tackle articles and the thumb of the user, as hereinafter described. The inner face of the slotted end wall 12 forms a stop or abutment engageable by a fishing tackle article placed in the notch.

A slot 16 is formed longitudinally in the tubular body substantially in the axial plane of the end wall slot 13 and extends from the notch 14 to the opposite end of the body, the longitudinal slot being provided with flared open ends.

At the open end portion of the tubular handle-forming body distant from the slotted end wall and preferably diametrically opposite the longitudinal slot, the body wall is provided with a row of spaced openings 17, this row of openings extending longitudinally of the body. These openings are of progressively increasing size in a direction away from the open end of the body and are adapted to admit the barbed ends of fishhooks of various sizes into the tubular body, as hereinafter described, thus providing retaining and guarding means for the fishhooks.

The tubular handle can be inexpensively and conveniently formed from a piece of sheet metal which may be about 1/32 inch thick, the workpiece originally being in the form of a flat blank. In some instances, the handle may be formed from metal tubing, or as a plastic molding.

The relatively narrow end wall slots 13 of the tubular handle is adapted to receive an eye forming a part of any one of a number of fishing tackle articles, as seen in FIGS. 4 to 6, so as to facilitate tying of a fishline 18 to the eye. The fishline 18 may be of the monofilament type. In the case of a swiveled eye the parallel opposite edges of the slot will also hold the eye against relative rotation.

In the arrangement of FIG. 4, the manually held implement of the invention is used to tie the fishline 18 to an end of a bait-skewering device or "strip-on" 19. This device includes a resilient skewer-forming wire 20 connected at an end to a swivel 21 having an attaching eye 22, the wire having a thin loop 23 at the other end for attaching other parts such as a fishhook. The wire 20 has mounted thereon the usual spinner 24, thrust beads 25, and flanged sleeve 26 which are normally in a forward position but for the tying operation are temporarily displaced rearwardly on the wire, permitting the wire to be admitted through the longitudinal slot 16 of the handle-opening body into the hollow interior of the body, so as to be out of the way and to permit proper positioning of the swiveled attaching eye 22 in the end wall slot 13 of the handle.

In the use of the assembly of FIG. 4, the skewer device 19 is placed in the longitudinally slotted handle body with the front swivel eye 22 projecting forwardly through the handle end wall slot 13 against relative rotation and outward axial displacement. With the handle grasped in one hand and with the thumb of this hand resting against the swivel in the handle notch 14, an end of the fishline 18 is passed through the projecting swivel eye by the other hand and is folded back against the line. The handle is then twirled or rotated about its axis a few times to cause the looped end of the line to become twisted, and the free end of the line is then inserted through the line loop at the swivel eye 22 and drawn tight, thus producing a knot 27 attaching the line to the swivel eye. The skewer device is then removed from the handle for further use.

The general arrangement of FIG. 4 is also applicable when tying a fishline to an eyed swivel carried by the end of a leader, such as a wire or cable, in which case the leader is disposed within the handle, like the wire 20 in FIG. 4.

In the assembly shown in FIG. 5, a fishlure 28 including a front eye 29 and a barbed hook 30 is placed on the handle, as shown, the eye projecting forwardly through the handle end wall slot 13, and the barbed end of the hook extending through the handle slot 16 into a guarded position within the handle. With the handle held in one hand and the thumb of this hand holding the lure in the notch of the handle, the fishline is held in the other hand and is manipulated to form a knot 27 attaching the line to the projecting eye of the lure, as in the assembly of FIG. 4.

In the assembly of FIG. 6, a triple swivel 31 is placed in the handle notch 14 against the abutment portion 15 and with an eye 32 of the swivel projecting through the end wall slot 13 against relative rotation and outward axial displacement. The fishline is then knotted to the swivel eye, as in the assembly of FIG. 4, a partly completed knot 27' being shown.

In the arrangement of FIG. 7, a fishhook 33 has its barbed end 34 entered in a selected one of the guard openings 17 of the handle, determined by the size of the fishhook, and has its terminal eye 35 projecting a short distance beyond the end of the handle. With the fishhook held in position on the handle by the thumb of the hand grasping the handle, the handle and fishline 18 are manipulated to form a knot 27 attaching the line to the fishhook eye. In a modified initial step, the shank of the guarded fishhook may temporarily be held in one hand while the end of the fishline is held in the other hand and passed through the fishhook eye, as shown in FIG. 8. In another modified initial step, the fishhook is held in the hand while the fishline is threaded through the fishhook eye, and the barbed end of the fishhook is then engaged in the holder.

The modified form of handle 10' shown in end elevation in FIG. 9 is similar to that of FIG. 1 except that a longitudinal slot 16' is formed in the handle body 11' between a pair of laterally spaced inturned flanges or cheeks 36 of the handle body. This handle construction will limit relative rotation of the barbed end of a fishhook engaged in the handle, and will also facilitate removal from the handle of a skewering wire or leader temporarily housed in the handle.

The term "fishline" as herein used includes a leader.

I claim:

1. An implement to facilitate tying of a fishline to an eye of a fishing tackle article, comprising an elongated body adapted to be manually held and to laterally support the article, said body having a transversely projecting end wall portion provided with an open-ended slot adapted to receive said eye outwardly therethrough in projecting line-admitting position, the inner face of said end wall portion forming an abutment engageable by the article.

2. An implement to facilitate tying of a fishline to an eye of a fishing tackle article, comprising an elongated body adapted to be manually held and to laterally support the article, said body having a transversely projecting end wall portion provided with an open-ended slot adapted to receive said eye outwardly therethrough in projecting line-admitting position, said body further having a slot extending longitudinally therein in alignment with said first-named slot and being open at opposite ends, said longitudinal slot being adapted to admit therein a part of the fishing tackle article.

3. An implement to facilitate tying of a fishline to an eye of a fishing tackle article, comprising an elongated body adapted to be manually held and having at an end portion thereof a lateral notch adapted to receive the article from the side of said body, said body having a transversely projecting end wall bounding the outer end of said notch and provided with an open-ended slot opening at the same side of said body as said notch and adapted to receive said eye outwardly therethrough in projecting line-admitting position, the inner face of said transversely projecting wall portion forming an abutment engageable by the article.

4. An implement to facilitate tying of a fishline to an eye of a fishing tackle article, comprising an elongated tubular body adapted to be manually held and having a transversely extending end wall with a radially extending slot opening at an edge of the end wall, said tubular body having a lateral notch extending longitudinally inwardly from said slotted end wall and adapted to receive said article, the inner face of said end wall defining an abutment-forming end of said notch, said tubular body also having a slot extending longitudinally of said body from said notch to the opposite end of said body and disposed substantially in the axial plane of said end wall slot, said longitudinal slot being open at both ends and adapted to admit therein a part of the fishing tackle article.

5. An implement to facilitate tying of a fishline to an eye of a fishing tackle article, comprising an elongated tubular body adapted to be held in the hand and having an end wall with a radially extending slot opening at an edge of the end wall, said tubular body having a lateral notch extending longitudinal inwardly from said slotted end wall and adapted to receive said article, said tubular body also having a slot extending longitudinally of said body from said notch to the opposite end of said body and disposed substantially in the axial plane of said slot, said longitudinal slot being open at both ends and adapted to admit therein a part of the fishing tackle article, said tubular body further having in its wall near an end thereof a plurality of selectively usable spaced openings adapted to receive the barbed end of a fishhook.

6. An implement to facilitate tying of a fishline to an eye of a fishing tackle article, comprising an elongated tubular body adapted to be held in the hand and having an end wall with a radially extending slot opening at an edge of the end wall, said tubular body having a lateral notch extending longitudinally inwardly from said slotted end wall and adapted to receive said article, said tubular body also having a slot extending longitudinally of said body from said notch to the opposite end of said body and disposed substantially in the axial plane of said slot, said longitudinal slot being open at both ends and adapted to admit therein a part of the fishing tackle article, said tubular body further having in its wall near an end thereof a plurality of selectively usable spaced openings adapted to receive the barbed end of a fishhook, said spaced openings being disposed at different distances from the adjacent end of said tubular body.

7. An implement to facilitate tying of a fishline to an eye of a fishing tackle article, comprising an elongated tubular body adapted to be manually held, said body being formed of a piece of sheet material bent to tubular shape and having its lateral portions spaced to form a slot extending longitudinally in said body, said body also having a transversely bent end wall portion with a radially extending slot disposed substantially in the axial plane of said longitudinal slot and having an open end at the same side of said body as said longitudinal slot, said body further having a notch extending between said slots and adapted to receive the fishing tackle article with its eye projecting outwardly through said end wall slot in position to admit a fishline to be tied to the eye, the inner face of said slotted end wall forming an abutment engageable by the article, and the longitudinal slot in said body being adapted to admit a part of said fishing tackle article.

References Cited by the Examiner

UNITED STATES PATENTS

| | | | |
|---|---|---|---|
| 2,734,299 | 2/1956 | Masson | 289—17 |
| 2,934,369 | 4/1960 | Kennedy | 289—17 |
| 3,106,417 | 10/1963 | Clow | 289—17 |
| 3,131,957 | 5/1964 | Musto | 289—17 |
| 3,177,021 | 4/1965 | Benham | 289—17 |

DONALD W. PARKER, *Primary Examiner.*

L. K. RIMRODT, *Assistant Examiner.*